United States Patent
Nobutani

(10) Patent No.: US 7,843,585 B2
(45) Date of Patent: Nov. 30, 2010

(54) INTERFACE MODULE, PRINTING DEVICE, PROGRAM, AND PRINTER MAINTENANCE METHOD

(75) Inventor: Tsutomu Nobutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1168 days.

(21) Appl. No.: 11/489,983

(22) Filed: Jul. 19, 2006

(65) Prior Publication Data

US 2007/0019237 A1    Jan. 25, 2007

(30) Foreign Application Priority Data

Jul. 20, 2005    (JP)    ............... 2005-209539

(51) Int. Cl.
 *G06F 3/12* (2006.01)
 *G06K 15/00* (2006.01)

(52) U.S. Cl. .................. 358/1.15; 358/1.14

(58) Field of Classification Search ............... 358/1.15, 358/1.1, 1.8, 1.9, 1.13, 1.14, 1.18, 448, 474, 358/468

See application file for complete search history.

(56) References Cited

U.S. PATENT DOCUMENTS

| | | | | |
|---|---|---|---|---|
| 5,047,957 A | * | 9/1991 | Ikenoue | 358/1.11 |
| 5,075,874 A | * | 12/1991 | Steeves et al. | 358/1.13 |
| 5,699,493 A | * | 12/1997 | Davidson et al. | 358/1.15 |
| 6,025,925 A | * | 2/2000 | Davidson et al. | 358/1.15 |
| 6,226,097 B1 | | 5/2001 | Kimura | |
| 7,158,946 B2 | * | 1/2007 | Sato et al. | 705/26 |
| 2007/0136129 A1 | * | 6/2007 | Handley et al. | 705/14 |

FOREIGN PATENT DOCUMENTS

| | | |
|---|---|---|
| JP | 10-222324 A | 8/1998 |
| JP | 10-235975 A | 9/1998 |
| JP | 2000309147 A | 11/2000 |
| JP | 2001-229004 | 8/2001 |
| JP | 2003-228474 | 8/2003 |
| JP | 2004-102396 A | 4/2004 |
| JP | 2004-220192 | 8/2004 |

* cited by examiner

*Primary Examiner*—Gabriel I Garcia
(74) *Attorney, Agent, or Firm*—Nutter McClennen & Fish LLP; John J. Penny, Jr.; Michael P. Visconti, III

(57) ABSTRACT

An interface module connected to a host device for generating print data and to a printing device for printing the print data, comprises a reception unit having at least two interfaces for receiving print data from the host devices connected to the interfaces, a parameter data acquisition unit for analyzing the received print data and acquiring parameter data for calculating the printing cost incurred by printing the print data, a parameter data storage unit for storing the acquired parameter data in predetermined categories including a category for each interface.

21 Claims, 6 Drawing Sheets

| Command group A | Command group B |
|---|---|
| communication transaction count | communication transaction count |
| communication data size (KB) | communication data size (KB) |
| print transaction count | print transaction count |
| print data size<br>text (dots)<br>graphics (dots) | print data size<br>text (dots)<br>graphics (dots) |
| paper feed distance (mm) | paper feed distance (mm) |
| auto-cutter count | auto-cutter count |
| paper consumption (mm) | paper consumption (mm) |

31 → communication transaction count
32 → communication data size
33 → print transaction count
34 → print data size
35 → paper feed distance
36 → auto-cutter count
37 → paper consumption

FIG. 5A

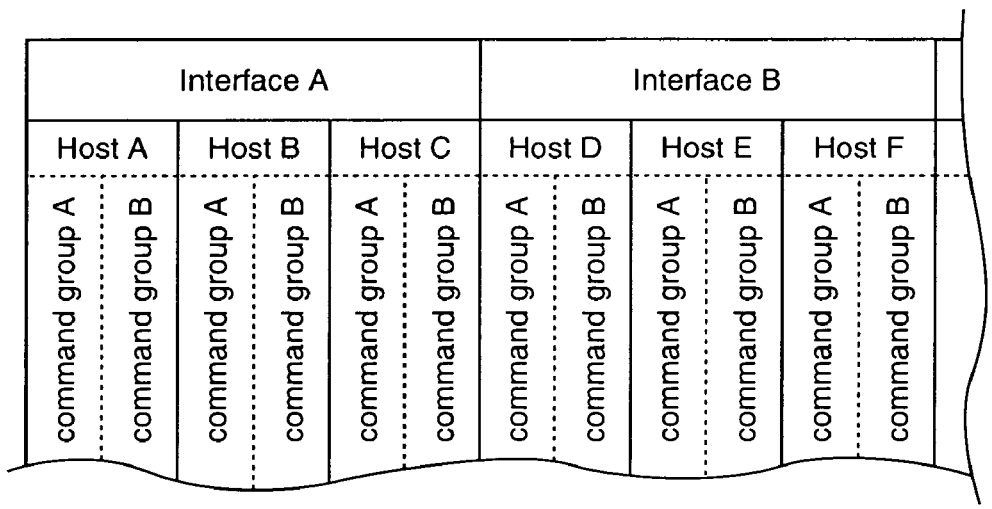

FIG. 5B (a) automatic paper cutter replacement cost share
    auto-cutter count / auto-cutter life x auto-cutter replacement cost (b) manual cutter replacement cost share
    (print transaction count - auto-cutter count) / manual cutter life x manual cutter replacement cost (c) power consumption cost share
    (paper feed distance x a1 + ink consumption x b1 + auto-cutter count x c1) x power consumption unit (d) maintenance cost share
    (paper feed distance x a2 + ink consumption x b2 + auto-cutter count x c2) x maintenance cost unit (e) printer replacement fund share
    (paper feed distance x a3 + ink consumption x b3 + auto-cutter count x c3) x counting period / product life span x printer replacement cost

INTERFACE MODULE, PRINTING DEVICE, PROGRAM, AND PRINTER MAINTENANCE METHOD

The present application claims benefit from Japanese Application No. JP 2005-209539 filed on Jul. 20, 2005, which is hereby incorporated by reference in its entirety.

BACKGROUND OF THE INVENTION

1. Field of Technology

The present invention relates to an interface module connected to a printing device that is shared by a plurality of users (host devices), to a printing device, a program, and a printer maintenance method.

2. Description of Related Art

Printing devices (printers) are commonly connected to a network so that a single printer can be shared by a plurality of users as taught, for example, in JP-A-2004-220192. Enabling multiple users to print information (print data) using a single printer reduces the amount of space that would be needed to provide a separate printer for each user, and thus also reduces printer cost.

Allocating maintenance costs (such as the cost for consumables such as ink and paper, and the cost for mechanical components (replaceable parts) such as the paper cutter, motors, gears, and paper transportation rollers) for such printers to each user based on each user's actual printer use is not possible, however, because how much each user has actually used the printer is unknown.

To solve this problem, the present invention provides an interface module that is connected to a printer shared by multiple users and enables allocating printer maintenance costs to each user based on their actual use of the printer, and provides a printing device, a program, and a printer maintenance method.

SUMMARY OF THE INVENTION

To achieve this object, an interface module according to a first aspect of the invention is an interface module connected to a host device for generating print data and to a printing device for printing the print data, and has a reception unit having at least two interfaces for receiving print data from the host devices connected to the interfaces; a parameter data acquisition unit for analyzing the received print data and acquiring parameter data for calculating a printing cost (maintenance cost) incurred by printing the print data; and a parameter data storage unit for storing the acquired parameter data in predetermined categories including a category for each interface.

BRIEF DESCRIPTION OF THE DRAWINGS

FIG. 5A shows an example of the parameter data, and FIG. 5B shows a method of storing the parameter data.

FIGS. 6(a)-6(e) show an example of a printing cost calculation method.

DESCRIPTION OF THE PREFERRED EMBODIMENTS

An interface module, a printer, a program, and a printer maintenance method according to a preferred embodiment of the present invention are described below with reference to the accompanying figures.

An interface module according to the present invention is connected to a host device and a printer, analyzes print data received from the host and calculates the printing cost incurred by printing the print data, and thereby enables allocating maintenance costs for a printer shared by multiple users to each user based on the actual printer usage by each user. The invention is therefore described below using by way of example a printing system comprising a plurality of host devices and a printer in which the interface module is installed.

Figure 1:
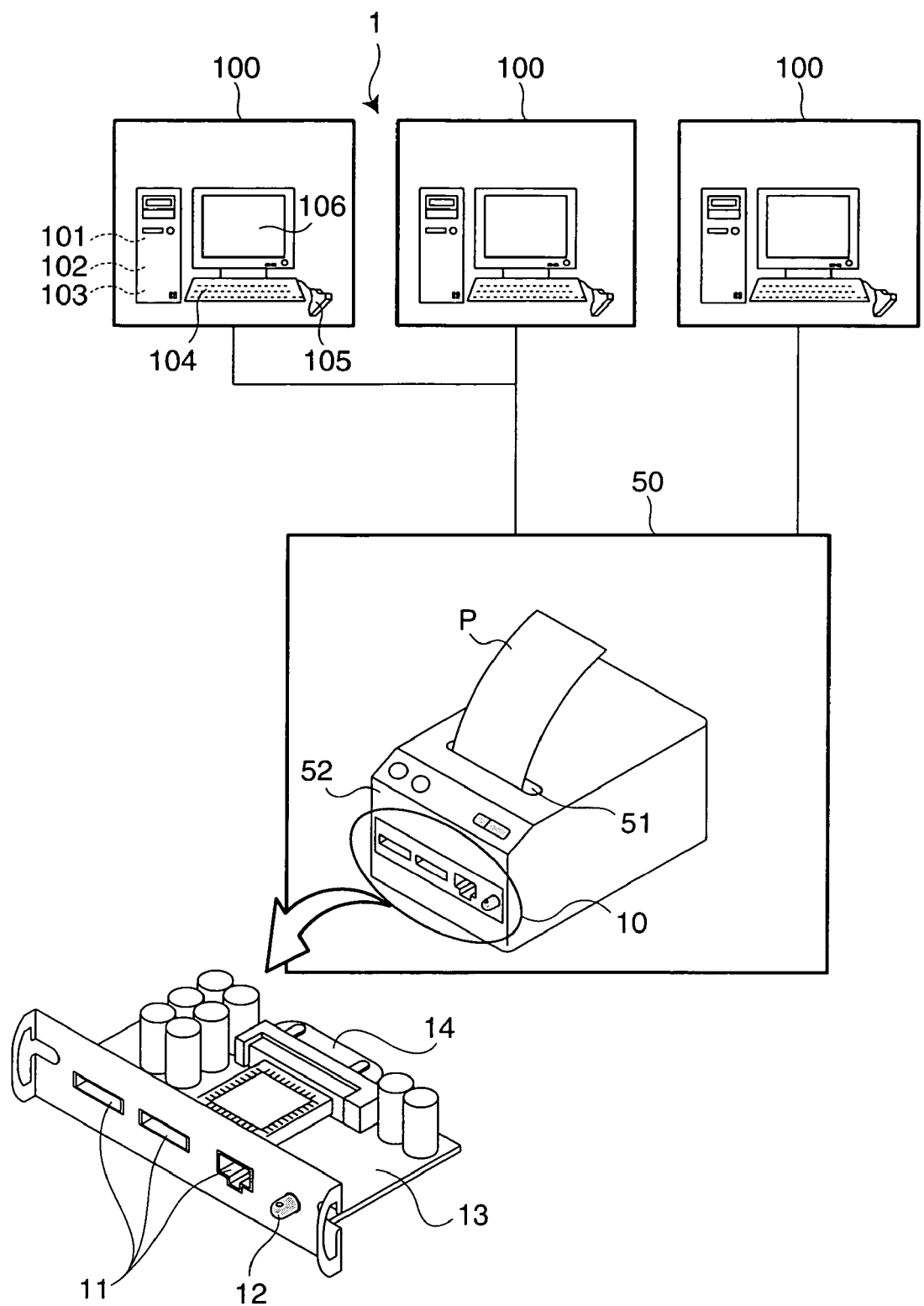
FIG. 1 schematically shows the arrangement of a printing system.

As shown in FIG. 1 this printing system 1 comprises host devices 100 (specifically three host devices 100 in this example) that generate print data, and a printer 50 that prints print data generated by each host device 100 on paper P.

Each host device 100 runs a POS application 101 for handling purchasing transactions in a store, a printer driver 102 for controlling printing on the printer 50, and a control unit 103 for controlling host device 100 operation. Based on input from input devices such as a keyboard 104 and barcode reader 105, the control unit 103 generates and displays transaction data on a display 106, and generates print data for printing a sales receipt on paper P based on the generated transaction data. The POS application 101 can also generate coupon print data for printing coupons used for advertising and sales promotion on the paper P.

A paper exit 51 from which the printed paper P (receipt or coupon) is discharged is formed on top of the printer 50. An interface module 10 ("module" below) having a plurality of network interfaces 11 to which the host devices 100 are connected is installed to the printer 50 through an installation slot 52 included in the main unit 50a.

The network interface 11 can be a USB, RS-232C or other type of serial interface, a parallel Centronics interface, an Ethernet (R) interface, a wireless LAN interface, or other type of interface. The network interfaces 11 shown in FIG. 1 conform to the 10Base-T and USB data communication standards, and include one 10Base-T interface and two USB interfaces.

The multiple network interfaces 11 and an operating indicator 12 (LED) for indicating the operating status of the module 10 are provided on the front of the module 10. The module 10 also has a control circuit board 13 populated with CPU 15, ROM 16, and RAM 17 chips (see FIG. 2). A connection unit 14 (connector) for connecting to the main unit 50a (printing control unit 53 and memory unit 54) is disposed at the back of the module 10.

Figure 2:
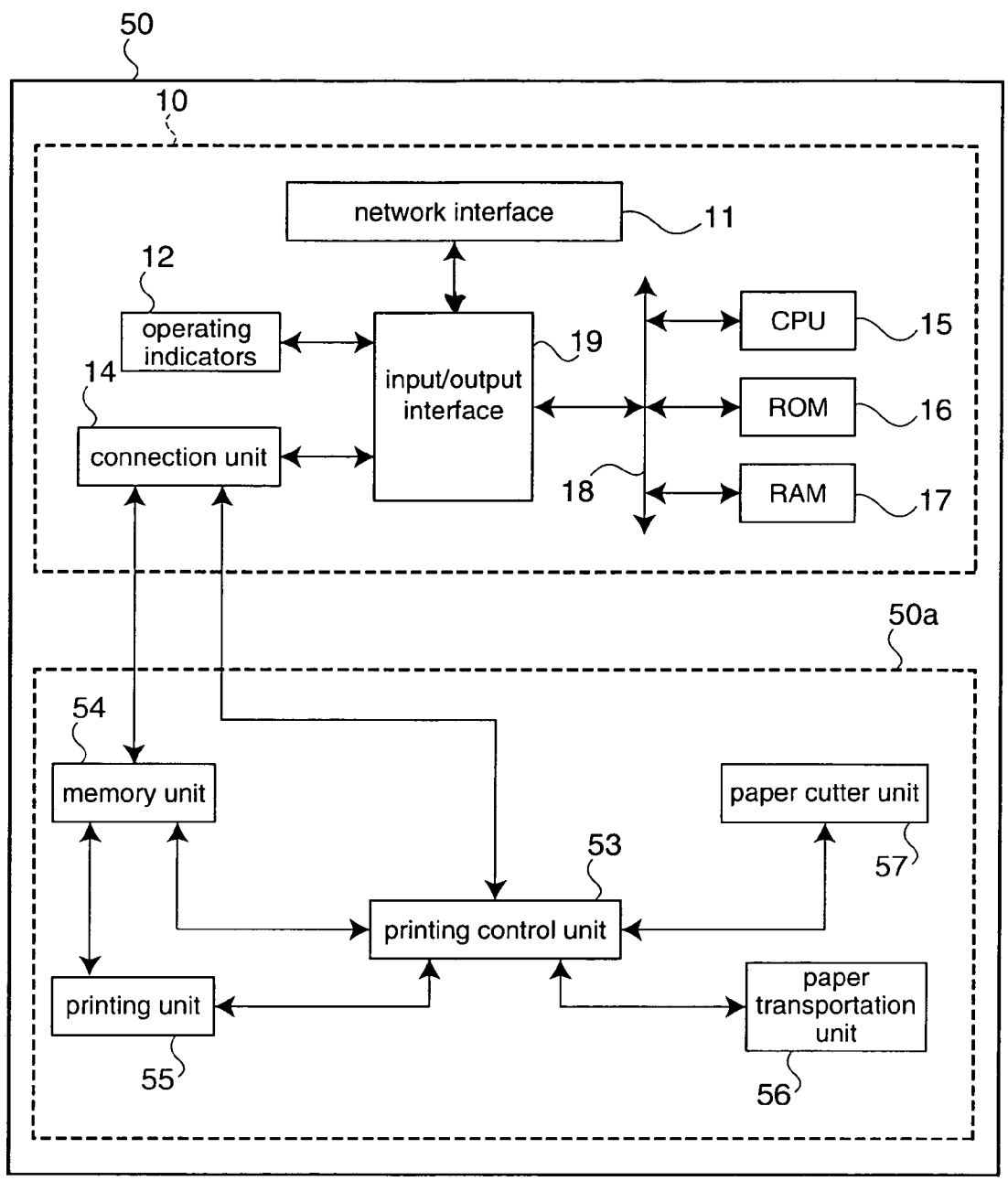
FIG. 2 is a control block diagram of a printer.

FIG. 2 is a control block diagram of the printer 50. In addition to multiple network interfaces 11 and a connection unit 14 as described above, the module 10 also has an operating indicator 12, CPU 15, ROM 16, and RAM 17 connected over an internal bus 18 to an input/output (I/O) interface 19. The ROM 16 stores a control program that is run by the CPU 15 to execute the print data analyzing process and printing cost calculation process described further below.

The I/O interface 19 comprises logic circuits for complementing the function of the CPU 15 and handling interface signals to peripheral circuits. These logic circuits pass print data (including control commands) received from the host device 100 directly or after processing to the internal bus 18, and output, in conjunction with the CPU 15, signals and data from the CPU 15 via the internal bus 18 to other units either directly or after processing. Based on a control program stored in ROM 16, the CPU 15 takes signal and data input from other parts inside the module 10 by way of the I/O interface 19, processes data in RAM 17 based on the input signals and data, and then outputs signals and data to other parts of the module 10 through the I/O interface 19, and thus controls processing, including sending and receiving print data. The operating indicator 12 is an LED that turns on when a process is executing in the module 10, and blinks when an error occurs.

The main unit 50*a* comprises a printing control unit 53, memory unit 54, a printing unit 55 including a print head, a paper transportation unit 56 having transportation rollers for conveying the paper P through the printing unit 55 synchronized to printing, and a paper cutter unit 57 for cutting the paper P.

The memory unit 54 includes RAM and nonvolatile memory, and acts as a reception buffer in RAM for storing print data sent from the module 10 (including control commands), and includes a parameter data block 54*a* (see FIG. 3) in nonvolatile memory for storing parameter data PI (see FIG. 5A) used for calculating the printing cost of a particular printing operation.

The paper cutter unit 57 includes an automatic paper cutter for automatically cutting the paper P based on a cut command, and a manual cutter enabling the operator to manually cut the paper P.

The printing control unit 53 controls printing, including converting data stored in the reception buffer to a data format that can be sent to the printing unit 55.

Figure 3:
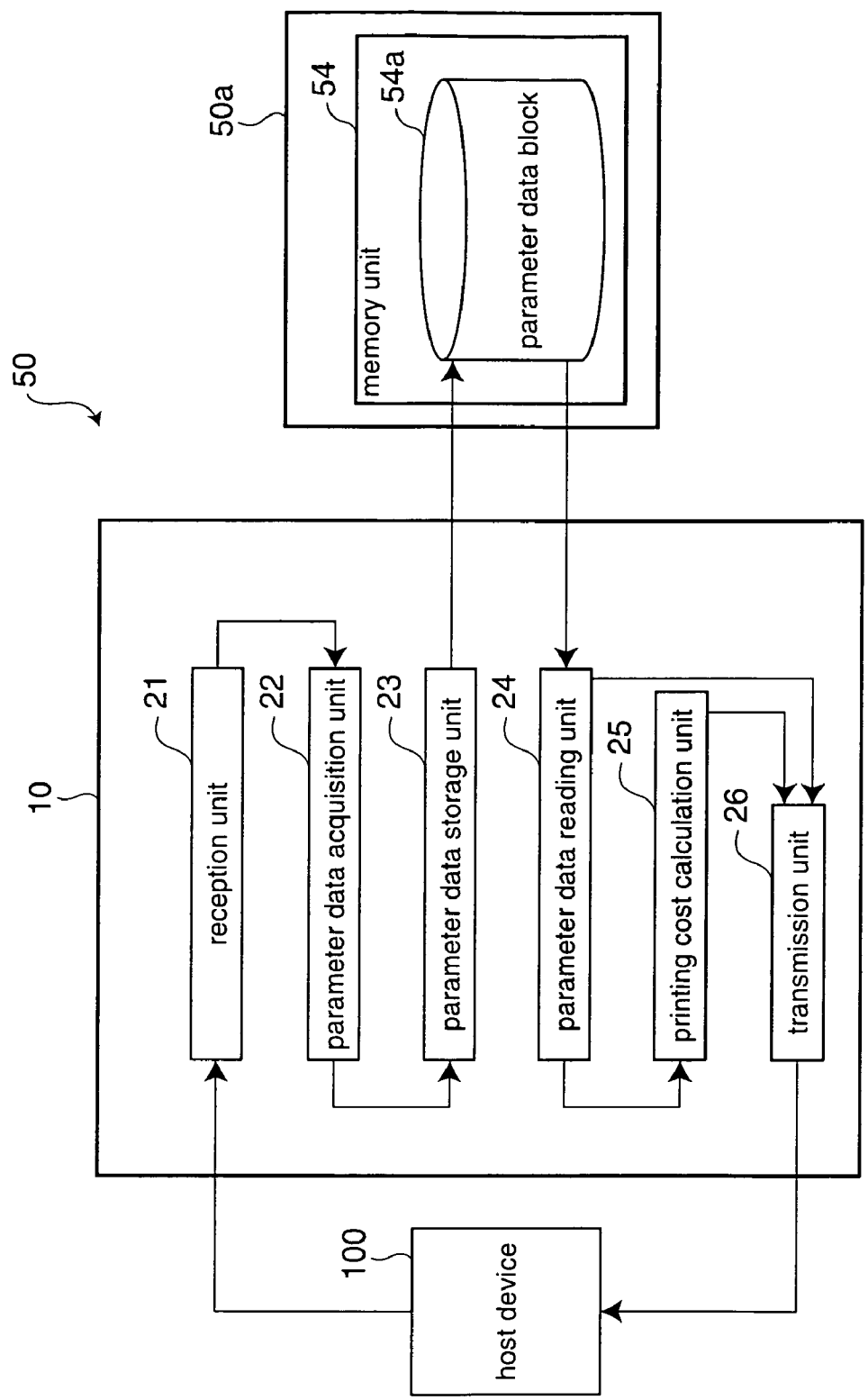
FIG. 3 is a function block diagram of a printer.

FIG. 3 is a function block diagram of the printer 50. The reception unit 21 part of the module 10 receives print data produced by the host device 100. The parameter data acquisition unit 22 analyzes the print data received by the reception unit 21, and acquires the parameter data PI (see FIG. 5A) used to calculate the printing cost of the printing process. The parameter data storage unit 23 stores the parameter data PI acquired by the parameter data acquisition unit 22 according to specific categories in the parameter data block 54*a* of the memory unit 54 in the main unit 50*a*.

The parameter data reading unit 24 reads the parameter data PI from the parameter data block 54*a*, and outputs the parameter data PI for processing in the module 10. Using the read parameter data PI as the parameters, the printing cost calculation unit 25 calculates the printing cost for each of predetermined categories based on predetermined equations (see FIG. 6). The parameter data block 54*a* for storing the parameter data PI can be located in nonvolatile memory in the module 10. The transmission unit 26 then sends the read parameter data PI and/or the calculated print data to the host device 100.

The reception unit 21 and transmission unit 26 are formed primarily by the network interfaces 11, and the other parts 22 to 25 can be performed by the CPU 15 processing data according to the control program in ROM 16 and working in conjunction with the I/O interface 19.

The parameter data storage process and printing cost calculation process executed by this module 10 are described next with reference to the flow charts in FIG. 4A and FIG. 4B.

Figure 4A:
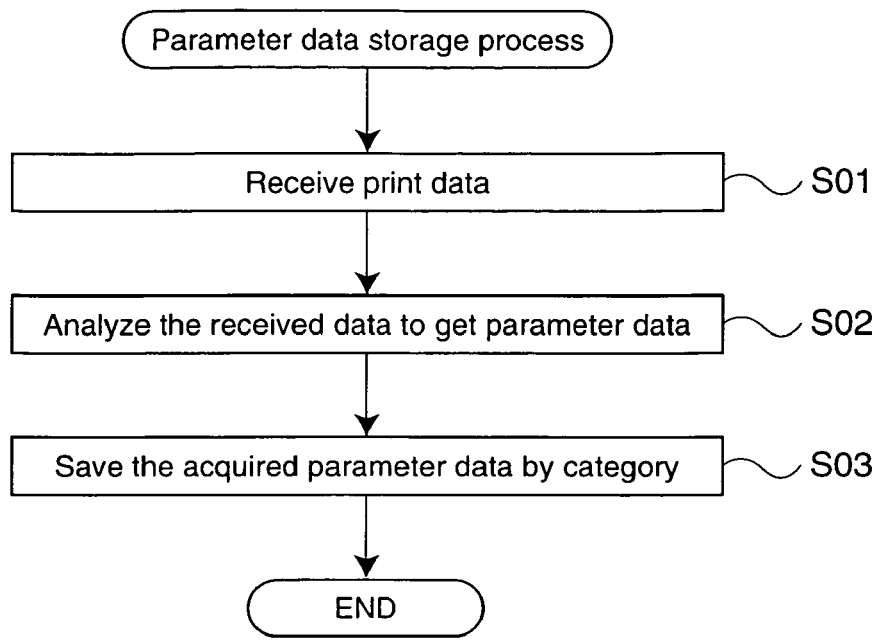
FIG. 4A is a flow chart showing a parameter data storage process.

The parameter data storage process shown in FIG. 4A starts with the reception unit 21 receiving print data (S01). The parameter data acquisition unit 22 then analyzes the received data and acquires the result of this analysis as parameter data PI (S02). The parameter data storage unit 23 then saves the acquired parameter data PI in specific categories (S03) in the parameter data block 54*a*.

Figure 4B:
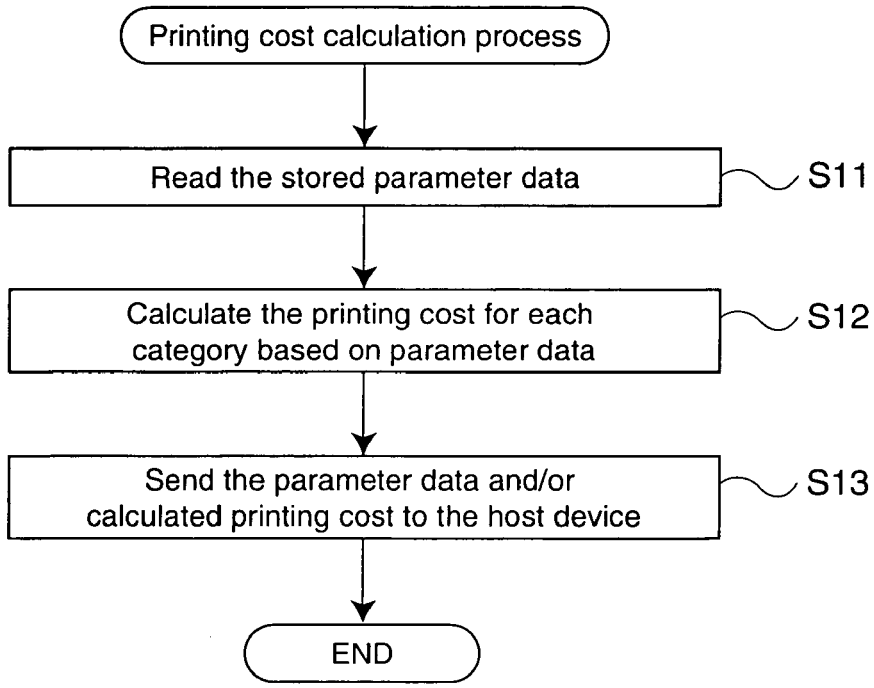
FIG. 4B is a flow chart showing a printing cost calculation process.

The printing cost calculation process shown in FIG. 4B starts with the parameter data reading unit 24 reading the stored parameter data PI (S11). The printing cost calculation unit 25 then calculates the printing cost for each of the predetermined categories using the read parameter data PI as the parameters (S12). The transmission unit 26 then sends the read parameter data PI and/or the calculated printing cost to the host device 100 (S13).

This printing cost calculation process is preferably run at some regular period, such as monthly or quarterly. The parameter data PI and printing cost information could also be sent to the host device 100 when requested by the host device 100.

The parameter data PI is described in detail next. As noted above, the parameter data PI is stored in predetermined categories in the parameter data block 54*a* of the memory unit 54 of the main unit 50*a*. Based on an identification command that is added to and identifies the print data, the parameter data PI shown in FIG. 5A is divided into a command group A (group A) denoting print data used to print sales receipts, and a command group B (group B) denoting print data used to print coupons.

The parameter data PI includes such parameters as a communication transaction count 31, communication data size 32, print transaction count 33, print data size 34, paper feed distance 35, auto-cutter count 36, and paper consumption 37. The parameter data PI can be set appropriately according to the consumables that are used by the printer 50 and the components of the printer 50.

The communication transaction count 31 tracks the number of print transactions where one print transaction is the sequence of operations from after a connection is opened for printing and print data is received until the connection is closed. The communication data size 32 is the total number of data bytes received by communication with the host device 100.

The print transaction count 33 is the number of print transactions where one transaction is a predetermined printing process, such as printing one receipt or coupon. The print data size 34 is the total size of printed data expressed in a specific unit, such as the number of dots. In this embodiment of the invention the print data size 34 is accumulated separately for text data and image (graphic) data.

The paper feed distance 35 is the total distance the paper is conveyed by the paper transportation unit 56 for printing by the printing unit 55 expressed in a specific unit, such as millimeters.

The auto-cutter count 36 is the number of automatic paper cutter operations completed by the paper cutter unit 57 after printing.

The paper consumption 37 denotes the total amount of paper, including white space, used for printing expressed in a specific unit, such as millimeters.

Based on the print data received from the host device 100, analyzing control commands (such as paper cut commands and graphic print commands) contained in the print data, and the communication data (such as the communication transaction count and byte count), the parameter data acquisition unit 22 acquires these parameters.

The communication transaction count 31 is not limited to this embodiment of the invention and can be based on a packet unit or other data unit. The communication data size 32 can likewise accumulate the number of data packets instead of the data byte count. If the printer 50 is an inkjet printer, for example, the print data size 34 could represent the total ink discharge volume calculated from the number of ink discharge operations.

Furthermore, while the parameter data PI is grouped based on an identification command added to the print data in this example, the parameter data PI could be grouped based on the host device 100 that sent the print data, or the parameter data PI could be grouped based on the network interface 11 that received the print data. More specifically, the parameter data PI can be grouped based on communication data (such as the IP address of the host device 100) included in the received print data, or based on the number of the port through which the print data was received.

Further alternatively, the parameter data PI can be grouped hierarchically by interface, host device, and command, for example, as shown in FIG. 5B. That is, a plurality of categories can be combined as the conditions for grouping the parameter data PI.

If maintenance information related to the use or consumption of consumables that are used internally by the printer 50 is stored in the memory unit 54, the parameter data acquisition unit 22 can acquire the parameter data PI from the maintenance information for storage in the parameter data block 54a. More specifically, when print data is received, the category information for grouping the parameter data PI is acquired from the print data, and the current maintenance information values are storage temporarily. When the printing process (one print transaction) ends, the current maintenance information values are referenced again (and could be stored temporarily). The difference between the maintenance information when the print data was received and the maintenance information after printing ends is then acquired as the parameter data PI and stored in the parameter data block 54a. This arrangement enables eliminating the print data analysis process of the parameter data acquisition unit 22.

The printing cost calculation process run by the printing cost calculation unit 25 is described next. FIG. 6 show examples of equations that can be used to calculate the printing cost using the parameters described above.

If the parameters belonging to command group A shown in FIG. 5A are used, for example, the replacement cost share for the automatic paper cutter in command group A, that is, the replacement cost share for driving the automatic paper cutter in a receipt printing process, can be calculated as the auto-cutter count divided by the auto-cutter life multiplied by the auto-cutter replacement cost as shown in FIG. 6(a).

Furthermore, as shown in FIG. 6(b), the manual cutter replacement cost share in command group A can be calculated as the print transaction count minus the auto-cutter count, that is, the manual cutter count, divided by the manual cutter life multiplied by the manual cutter replacement cost.

As shown in FIG. 6(c), the share of the cost of power supplied to the printer 50 in command group A can be calculated as the sum of the paper feed distance, ink consumption, and auto-cutter count multiplied by coefficients $a1$, $b1$, and $c1$, respectively, multiplied by the power consumption unit, where coefficients $a1$, $b1$, and $c1$ denote the contribution factor of command group A.

As shown in FIG. 6(d), the share of printer 50 maintenance costs for the command group A categories can be calculated as the sum of the paper feed distance, ink consumption, and auto-cutter count multiplied by coefficients $a2$, $b2$, and $c2$, respectively, multiplied by the maintenance cost unit, where coefficients $a2$, $b2$, and $c2$ denote the contribution factor of command group A.

As shown in FIG. 6(e), the printer replacement fund share for purchasing the next replacement printer 50 for the command group A categories can be calculated as the sum of the paper feed distance, ink consumption, and auto-cutter count multiplied by coefficients $a3$, $b3$, and $c3$, respectively, where coefficients $a3$, $b3$, and $c3$ denote the contribution factor of command group A, multiplied by the quotient of the counting period from the previous cost calculation to the present cost calculation divided by the product life span, multiplied by the replacement cost of the printer 50.

The contribution factor coefficients $a1$ to $c3$ do not simply denote the cost calculation category as a percentage of the total of all categories, but also reflect the predetermined contribution of each category, and are specific coefficients defined for each calculated printing cost.

The printing costs associated with command group B printing operations, that is, printing coupons in this example, are similarly calculated by completing these calculations using the command group B parameters. By thus calculating the printing costs incurred by receipt printing processes and the printing costs incurred by coupon printing processes based on the actual cost ratios, the costs associated with receipt printing processes can be allocated to the store, and the costs associated with coupon printing processes can be allocated to the company issuing the coupons, for example. As a result, printer maintenance costs can be fairly allocated to the store operator and to the company issuing the coupons.

The ink consumption parameter used in these equations can be calculated based on the print data size 34 contained in the parameter data PI.

In addition, constants such as the auto-cutter life, auto-cutter replacement cost, manual cutter life, manual cutter replacement cost, power consumption cost share, and maintenance cost share can be stored in the memory unit 54 of the printer 50 and the printing cost calculation unit 25 can read these constants from memory unit 54 instead of embedding the constants in the program (printing cost calculation unit 25) for calculating the printing cost. Further alternatively, these constants can be sent from the host device 100 to the module 10 when the printing cost is calculated. These arrangements enable using a general common module 10 with multiple printers 50 of different specifications.

Furthermore, the printing costs calculated by the module 10 are not limited to the printing costs shown in FIG. 6, and various printing costs can be calculated based on actual information. For example, the communication transaction count and communication data size parameters can be used to calculate a share of the network operating cost. Furthermore, if interfaces with different data transfer rates are used, the communication rate of the interfaces is also preferably reflected in the printing cost calculation.

The parameter data PI is also preferably reset when the printing cost calculation process ends. Alternatively, the parameter data PI values can be stored when the printing cost calculation process ends instead of being reset, so that the difference between the stored parameters and the parameters that are current the next time printing costs are calculated can also be used as a parameter in the cost calculation. The stored parameter data PI and/or the calculated printing costs can also be printed using the printer 50.

Application of the parameter data PI and/or printing cost information sent by the transmission unit 26 to the host device 100 is described next. The parameter data PI and/or printing cost information received by the host device 100 can, for example, be presented on the display 106. This enables the user to easily verify the parameter data PI and/or printing cost information using the host device 100.

The user could also specify a desired category using the host device 100, and the module 10 could send the parameter data PI and/or printing cost information for the requested category to the host device 100.

The printer 50 or host device 100 could also be capable of communicating with a transaction processing server that processes the transactions, and transaction processing can be executed automatically as a result of the printer 50 or host device 100 sending the printing cost calculated for each category with credit information or other transaction information for each category to the transaction processing server. This arrangement enables simplifying the process of billing users for the maintenance costs.

As described above, an interface module 10 according to this embodiment of the invention stores parameter data PI used for calculating printing costs in predetermined categories, and calculates printing costs for each category using the stored parameter data PI. When multiple users share a printer, the printer 50 maintenance costs can be calculated and allocated to each user based on each user's actual printer usage by grouping and storing the present invention for each user. The need to manually calculate printing costs for each category can also be eliminated because the printing cost is automatically calculated for each category based on the stored parameter data PI.

The interface module 10 according to this embodiment of the invention enables calculating a printing cost for each interface 11. If multiple users that share a printer each access the printer through a specific interface, printer maintenance costs can therefore be allocated to each user based on actual printer usage by each user. If the components (steps) for acquiring the printing cost are part of the interface module 10, a function for acquiring the printing cost can be added without modifying the printer 50 or with minimal printer modification.

The interface module 10 according to this embodiment of the invention is integrated with the printer 50 in this example, but the interface module 10 can be disposed separately from the printer 50, such as by a wired or wireless connection between the host device 100 and printer 50.

This embodiment of the invention is described with the printer 50 printing print data generated by the POS application of the host device 100 to paper P, but the type of print data generated by the host device 100 is not limited to such print data. Furthermore, the host device 100 that generates the print data can be an external server that is connected to the printer 50 over the Internet, for example.

The present invention can also be rendered as a program implementing the functions of the interface module 10 according to this embodiment of the invention. This program can also be provided stored on a computer-readable data recording medium. This recording medium can be a semiconductor memory device such as flash memory or a memory card, a magnetic disk such as a floppy disk or hard disk, an optical disc such as a CD, DVD, or magneto-optical disc, or any other type of data storage medium that can be read electrically, magnetically, optically, or otherwise.

The functional units of the invention can also be rendered by the printer itself by storing this program in the printer 50.

The invention is also not limited to this embodiment of the invention, and the arrangement and processes of this printing system 1 can be varied in many ways without departing from the scope of this invention.

What is claimed is:

1. An interface module adapted to be connected to two or more host devices each of said host devices capable of generating print data, and to a printing device that is capable of printing the print data, comprising:
   a reception unit having at least two interfaces each for connection to a host device and for receiving print data from a connected host device;
   a parameter data acquisition unit for analyzing the received print data and acquiring parameter data from the received print data for calculating a printing cost incurred by printing the received print data;
   a parameter data storage unit that stores the acquired parameter data separately for each of a plurality of predetermined categories and separately for each of the at least two interfaces; and
   a printing cost calculation unit that calculates the printing cost for each of the plurality of predetermined categories and for each of the at least two interfaces based on the stored parameter data;
   wherein the parameter data is stored when the printing cost calculation unit finishes calculating the printing cost, and the difference between the stored parameter data and current parameter data is used in the printing cost calculation unit.

2. The interface module of claim 1, wherein the parameter data includes one or more of a communication transaction count, a communication data size, a print transaction count, a print data size, a paper feed distance, an auto-cutter count, a paper consumption count, and a recording material usage count.

3. The interface module of claim 2, wherein the communication transaction count or the communication data size is based on a packet unit or other data unit.

4. The interface module of claim 1, adapted for use with the printing device, wherein said printing device stores maintenance information relating to usage or consumption of consumable components used in the printing device, wherein the parameter data acquisition unit is adapted to acquire the parameter data from the maintenance information instead of from the print data.

5. The interface module of claim 1, adapted for use with host devices that add identification information for identifying a type of parameter data to the print data, wherein the parameter data storage unit is adapted to group the parameter data based on the identification information.

6. The interface module of claim 5, wherein the identification information includes host identification information for identifying a host device.

7. The interface module of claim 1, further comprising a transmission unit for sending the stored parameter data to a host device, wherein said host device sends print data with which the parameter data is related.

8. The interface module of claim 1, further comprising a transmission unit for sending the calculated printing cost to a host device, wherein said host device incurs the printing cost.

9. A printing device comprising the units of an interface module described in claim 1.

10. A non-transitory computer readable storage medium with an executable program stored thereon, wherein the program instructs a microprocessor to function as the units of an interface module described in claim 1.

11. The interface module of claim 1, wherein the parameter data storage unit groups the parameter data based on one of a host device that sent the print data, a network interface that received the print data, and a hierarchy of said interface, said host device, and an identification command included in the print data.

12. The interface module of claim 1, wherein the printing cost calculation unit calculates printer costs based on constants stored in a memory unit, or sent from a host device.

13. The interface module of claim 1, wherein the parameter data is reset when the printing cost calculation process ends.

14. The interface module of claim 1, wherein the interface module is integrated with a printer, or disposed separate from a printer.

15. A maintenance method for a printing device that is connected to two or more host devices via respective interface, the printing device being shared by said two or more host devices and being adapted for printing print data generated by the host devices, wherein the printing device executes:
   a) receiving print data from a host device through a respective interface;
   b) analyzing the received print data and acquiring parameter data from the received print data for calculating a printing cost incurred by printing the received print data;
   c) storing the acquired parameter data separately for each of a plurality of predetermined categories and separately for each of the respective interfaces; and
   d) calculating the printing cost for each of the plurality of predetermined categories and for each of the respective interfaces based on the stored parameter data;
   wherein the parameter data is stored when the printing cost calculation ends, and the difference between the stored parameter data and current parameter data is used in calculating the printing cost.

16. The printer maintenance method of claim 15, wherein the parameter data includes one or more of a communication transaction count, a communication data size, a print transaction count, a print data size, a paper feed distance, an auto-cutter count, a paper consumption count, and a recording material usage count.

17. The printer maintenance method of claim 15, wherein step b) uses maintenance information stored in the printing device and relating to usage or consumption of consumable components used in the printing device, instead of the print data to acquire the parameter data.

18. The printer maintenance method of claim 15, wherein the print data includes identification information identifying a type of parameter data; and step b) groups the parameter data based on the identification information.

19. The printer maintenance method of claim 18, wherein the identification information includes host identification information for identifying a host device.

20. The printer maintenance method of claim 15, further comprising d) sending the stored parameter data to a host device, wherein said host device sends the print data with which the parameter data is related.

21. The printer maintenance method of claim 15, further comprising f) sending the calculated printing cost to a host device that incurred the printing cost.

* * * * *